United States Patent [19]

Holinski

[11] Patent Number: 5,445,748
[45] Date of Patent: Aug. 29, 1995

[54] SOLID LUBRICANT COMPOSITION

[75] Inventor: Rudiger Holinski, Munich, Germany

[73] Assignee: Dow Corning GmbH, Wiesbaden, Germany

[21] Appl. No.: 175,453

[22] Filed: Dec. 30, 1993

[30] Foreign Application Priority Data

Jan. 11, 1993 [DE] Germany .......... 43 00 464.4

[51] Int. Cl.⁶ .......... C10M 103/00
[52] U.S. Cl. .......... 252/30; 106/38.27
[58] Field of Search .......... 252/27, 29, 30, 12; 106/38.27

[56] References Cited

U.S. PATENT DOCUMENTS

| | | | |
|---|---|---|---|
| 3,826,744 | 7/1974 | Holinski et al. | 252/23 |
| 3,836,466 | 9/1974 | Wataru et al. | 252/12 |
| 4,052,323 | 10/1977 | Feneberger et al. | 252/33 |
| 4,168,241 | 9/1979 | Kozima et al. | 252/18 |
| 4,663,060 | 5/1987 | Holinski | 252/12 |

FOREIGN PATENT DOCUMENTS

| | | |
|---|---|---|
| 399728 | 11/1990 | European Pat. Off. . |
| 3916807 | 8/1990 | Germany . |
| 467096 | 10/1975 | U.S.S.R. . |

*Primary Examiner*—Prince Willis, Jr.
*Assistant Examiner*—Cephia D. Toomer
*Attorney, Agent, or Firm*—Robert Spector

[57] ABSTRACT

A solid lubricant composition comprises (I) 30 to 70 parts by weight of graphite, (II) 70 to 30 parts by weight of a mixture of at least two components selected from alkali molybdate, alkali or alkaline earth sulphate and alkali phosphate, the ratio of the two individual ingredients being in the range of from 0.05/1 to 20/1. Compositions give improved load-bearing capacity and allows settling of friction coefficient.

7 Claims, No Drawings

SOLID LUBRICANT COMPOSITION

The present invention relates to a solid lubricant composition, to a process for the preparation thereof and to the use of this solid lubricant composition.

Solid lubricants are being used for manifold purposes. They are directly used e.g. in the form of pastes or anti-friction coatings or are used as additives to greases and oils in order to improve the lubricating effect. Such addition also secures some emergency lubrication in case the oil is lost, e.g. due to a leak in a system. A solid lubricant often used is molybdenum disulphide which exhibits an excellent lubricity. Due to its lamellar structure it exhibits an excellent film-forming ability as the lamellae can slide over each other. The use of molybdenum disulphide entails, however, the disadvantage that under certain conditions sulphur is liberated which may have a corrosive effect in a humid environment. At temperatures above 300° C. molybdenum disulphide liberates sulphur to an increased extent which, at high temperatures, diffuses into steel surfaces and may cause stress corrosion. In some fields the use of molybdenum disulphide is therefore no longer allowed. Attempts have been made to replace molybdenum disulphide with other solid lubricants which only exhibit the advantages, but not the disadvantages of molybdenum disulphide. In this respect graphite which also has a lamellar structure has been suggested. As graphite consists only of carbon the surfaces of the lamellae do not have a polar structure. Consequently pure graphite adheres poorly to metal surfaces and does not form load-bearing films. Moreover, external conditions strongly influence the lubricity of graphite. In order to improve the lubricity of graphite it has already been suggested to add other lubricants to graphite. For example, it is known from GB-A-1 256 349 to improve the film-forming ability of graphite by the addition of sodium fluoride. The results obtained were, however, not satisfactory; moreover the addition of a compound containing halide ions may still cause corrosion problems. Further, SU-A-467 096 suggests producing a solid lubricant by mixing graphite powder with 5 to 11 weight percent of potassium tungstate or potassium molybdate. This addition resulted in considerably reduced abrasion. However, this combination did not lead to satisfactory results either.

There is a need to provide a solid lubricant which exhibits good film-forming abilities with good lubricity in which the coefficient of friction remains substantially independent from external conditions and which does not have any corrosive effect on substrates lubricated therewith.

According to the invention there is provided a solid lubricant composition comprising (I) 30 to 70 parts by weight of graphite, (II) 70 to 30 parts by weight of a mixture of at least two components selected from (a) alkali molybdate, (b) alkali and/or alkaline earth sulphate and (c) alkali phosphate, the ratio of the two components being in the range of from 0.05/1 to 20/1.

It has been found that the compositions according to the present invention exhibit excellent lubricity. It has also been found that the resistance to abrasion of items treated with said composition is improved. It has surprisingly also been found that the use of compositions according to the invention offers the possibility of adjusting the coefficient of friction to a desired level.

It is preferred that the composition according to the invention consists of 30 to 70 weight percent of graphite and 70 to 30 weight percent of the mixture of at least two components selected from components (a), (b) and (c) as indicated above. Most preferably no other ingredients are present.

The first essential component of a solid lubricant composition according to the present invention is graphite. It is preferred that the type of graphite used is the type usually employed in the field of solid lubrication. This graphite has an average particle size ranging from 5 to 50 $\mu$m. In the preferred compositions according to the invention the graphite is used in a proportion of 30 to 70 percent by weight of the solid lubricant composition. More preferably graphite is present in an amount comprising 40 to 60 weight percent, especially preferred is 45 to 55 weight percent.

The second essential component according to the present invention is a mixture (II) of at least two components selected from (a) alkali molybdate, (b) alkali and/or alkaline earth sulphate and (c) alkali phosphate. It is essential that at least two components selected from (a), (b) and (c) are present, although a mixture of more than two components of one or more of (a), (b) or (c) may also be used. The minimum composition of mixture (II) consists therefore of either one component (a) and one of component (b), one component (a) and one component (c) or one component (b) and one component (c). The selection of the individual components for mixture (II) is made in accordance with the purpose of use. Alkali molybdate generates a low coefficient of friction which is of importance if the lubricant is to be used for bearings, shafts or the like. The addition of alkali or alkaline earth sulphate leads to a medium-range coefficient of friction and will therefore be employed if a higher coefficient of friction is desired. The most favourable proportions can be ascertained in a few routine tests. The preferred alkali molybdate is sodium molybdate. The preferred sulphate is alkali sulphate, the use of sodium sulphate being especially preferred.

Alkali phosphate is the third component which may be selected to be contained in the mixture (II) of the present invention. This component (c) leads also to a synergistic improvement of the already good properties of the mixture consisting of graphite and alkali molybdate and/or alkali or alkaline earth sulphate. The preferred alkali phosphate is sodium phosphate; the alkali phosphate is especially preferred to be sodium orthophosphate. Only a mixture of the two essential ingredients, i.e. graphite and mixture (II) containing at least two components selected from (a) alkali molybdate, (b) alkali and/or alkaline earth sulphate and (c) alkali phosphate exhibits the excellent properties such as improved resistance to abrasion, high load-bearing capacity, constant physical properties substantially independent from external conditions and good protection against rust. In order to obtain these favourable properties a mixture consisting of two of the aforementioned ingredients will be sufficient. In a preferred embodiment mixture (II) comprises only two components. For adjusting the coefficient of friction it will in some cases be advantageous if the mixture consisting of three components is used.

The proportion of the solid lubricant composition according to the invention, which is taken up by mixture (II), is preferably in the range of from 70 to 30% by weight more preferably from 60 to 40% and most preferably from 55 to 45% by weight. The weight ratio of the two individual components of mixture (II), or where more than 2 are used each set of 2 components of mixture (II), i.e. the ratio of alkali molybdate to alkali or alkaline earth sulphate, alkali molybdate to alkali phosphate, or alkali or alkaline earth sulphate to alkali phosphate is selected in accordance with the purpose of use. By varying the ratio of the components of mixture (II) the coefficient of friction of the solid lubricant compositions according to the invention may be adjusted to a desired level. The components used according to the invention affect the coefficient of friction in various manners; by a suitable combination of the components it is therefore possible to generate a high or a low coefficient of friction. The coefficient of friction thus obtained by a specific lubricant composition according to the present invention will also remain substantially stable independent of external conditions such as temperature, pressure or humidity. The ratio of the components is selected in accordance with the actual situation. Generally the individual components of mixture (II) are used in such amounts that the ratio of any two such components is in the range of from 0.05/1 to 20/1. If a higher coefficient is required, as in the case of brake linings, one will select a higher amount of alkali phosphate, as alkali phosphate generates a high coefficient of friction compared to the amount of alkali molybdate which generates a lower coefficient of friction. On the other hand, in cases requiring a low coefficient of friction the amount of alkali phosphate will be lower compared to the amount of alkali molybdate. An alkali or alkaline earth sulphate, having a coefficient of friction between the one of alkali molybdate and the one of alkali phosphate, will be preferred for the adjustment of medium-range coefficients of friction.

The solid lubricant compositions according to the present invention can be prepared by simple mixture of the individual ingredients. However, the properties of the solid lubricant compositions according to the invention are optimised if a homogeneous mixture is prepared. It is possible to obtain a homogeneous mixture by intermixing the individual dry components; however, this procedure requires great investment.

Another aspect of the invention provides a process for the preparation of the solid lubricant composition according to the previous aspect of the invention wherein (i) the components of mixture (II) are dissolved in water, (ii) graphite is added to the solution to form a slurry, (iii) the obtained slurry is dried and (iv) the dried substance is pulverised to the desired particle size, preferably a particle size which is similar to the particle size of the graphite employed.

By this process a very homogeneous mixture of all components is obtained, which means that the salts i.e. components of mixture (II), are very evenly distributed in the graphite and thus yield the desired favourable properties.

In the process according to the invention the components of mixture (II) of the composition according to the invention are dissolved in water in a manner which is known, the graphite is added to form a slurry and the slurry is then dried. The pulverisation of the dried slurry is carried out in a known manner, normally by grinding. Preferably the solid lubricant composition is pulverised to a particle size which is within the range of the particle size of the graphite used, i.e. from 5 to 50 $\mu$m.

The solid lubricant composition according to the present invention may be used as a solid lubricant per se, or may be used as an additive to other lubricants. The solid lubricant composition according to the invention is especially suited for brake linings; for such application a high amount of alkali phosphate and a low amount of alkali molybdate are preferably used. Such solid lubricant compositions have a very high coefficient of friction which remains very stable independently of ambient humidity, ambient temperature etc. and which keep wear of the lining low. It has been found that compositions according to the present invention smooth the friction process; consequently less vibrations are generated and brake noises are reduced. A solid lubricant composition which is especially suited for this purpose consists of approximately 50% of graphite, approximately 10% of sodium molybdate and approximately 40% of sodium phosphate.

In addition solid lubricant compositions, according to the present invention, are especially suitable for the lubrication of sinter metals and of sinter ceramics which are used for bearings and shafts and for the preparation of composites. It is important for shafts and bearings to have a relatively low coefficient of friction. For such application a solid lubricant is especially preferred which contains approximately 50% of graphite, approximately 40% of sodium molybdate and approximately 10% of sodium phosphate.

It is accordingly preferred that mixture (II) consists of 20 to 80 parts by weight of alkali molybdate and/or alkali or alkaline earth sulphate and 80 to 20 parts by weight of alkali phosphate.

Another suitable field of use of the composition according to the invention is the treatment of carbon brushes which are employed, e.g. in electromotors. Also in this field of application low coefficients of friction are desired.

The present invention provides a solid lubricant composition which exhibits an excellent load-bearing capacity and which offers moreover the possibility of adjusting the coefficient of friction to a desired level. The load-bearing capacity is substantially higher than that of known lubricants. This exceptionally large load-bearing capacity can only be achieved by the use of the composition as defined by the present invention.

The present invention will be illustrated hereinafter by the following examples wherein all parts and percentages are expressed by weight.

EXAMPLES 1 TO 4

The illustrative solid lubricant compositions were prepared by dissolving 25 parts by weight of component (A) and 25 parts by weight of component (B) in water and mixing 50 parts by weight of graphite having an average particle size in the range 5 to 50 ppm to form a slurry. The slurry was stirred and the water evaporated under reduced pressure. The dried composition was then ground to give a solid lubricant composition with an average particle in the range from 5 to 50 $\mu$m and a composition as shown in Table I.

TABLE I

| Example Lubricant | Component A | Component B |
| --- | --- | --- |
| LUB 1 | $Na_2MoO_4$ | $Na_3PO_4$ |
| LUB 2 | $Na_2MoO_4$ | $Na_2SO_4$ |
| LUB 3 | $Na_3PO_4$ | $Na_2SO_4$ |
| LUB 4 | $Na_2MoO_4$ | $BaSO_4$ |

COMPARATIVE EXAMPLES 1 TO 6

Comparative solid lubricant compositions 1 to 5 were prepared according to the process of Examples 1 to 4 except that instead of 25 parts of component A and 25 parts of component B, 50 parts of component C were used as shown in Table II.

TABLE II

| Comparative Lubricant | Component C |
| --- | --- |
| CLUB 1 | $Na_2MoO_4$ |
| CLUB 2 | $Na_3PO_4$ |
| CLUB 3 | $CaSO_4$ |
| CLUB 4 | $Na_2SO_4$ |
| CLUB 5 | $BaSO_4$ |

Comparative lubricant composition 6 consisted of 100% graphite.

EXAMPLE 5

For each of the Example and Comparative lubricant compositions the high load-bearing capacity (LCC) in Newton (N) and the coefficient of friction $\mu$ at 10,000N, were determined according to known tests. The results of these tests are shown in Table III.

TABLE III

| Lubricant | LCC High Pressure (N) | Coefficient of Friction $\mu$ at 10,000 N |
| --- | --- | --- |
| LUB 1 | 26,000 | 0.10 |
| LUB 2 | 27,000 | 0.11 |
| LUB 3 | 27,000 | 0.11 |
| LUB 4 | 25,000 | 0.09 |
| CLUB 6 | 500 | 0.40 |
| CLUB 1 | 10,000 | 0.05 |
| CLUB 2 | 14,000 | 0.27 |
| CLUB 3 | 11,500 | 0.20 |
| CLUB 4 | 16,000 | 0.15 |
| CLUB 5 | 21,000 | 0.10 |

These results show that the high load-bearing capacity of a solid lubricant composition of the present invention comprising three components is by far higher than that of the comparative mixtures.

That which is claimed is:

1. A solid lubricant composition comprising (I) 30 to 70 parts by weight of graphite, (II) 70 to 30 parts by weight of a mixture of at least two components selected from the group consisting of (a) sodium molybdate, (b) sodium sulphate, (c) barium sulphate and (d) sodium phosphate, the ratio of the two components being in the range of from 0.5/1 to 20/1.

2. A solid lubricant composition according to claim 1 wherein mixture (II) consists of from 20 to 80 parts by weight of a member selected from the group consisting of sodium molybdate, sodium sulfate and barium sulfate and from 80 to 20 parts by weight of sodium phosphate.

3. A solid lubricant composition according to claim 1 which contains 40 to 60 parts by weight of graphite.

4. A solid lubricant composition according to claim 3 which contains 45 to 55 parts by weight of graphite.

5. A process for the preparation of a solid lubricant composition comprising (I) 30 to 70 parts by weight of graphite, (II) 70 to 30 parts by weight of a mixture of at least two components selected from the group consisting of (a) alkali molybdates, (b) a member of the group consisting of alkali sulphates and alkaline earth sulphates and (c) alkali phosphates, the ratio of the two components being in the range of from 0.05/1 to 20/1, wherein the process comprises (i) dissolving the components of mixture (II) in water (ii) adding graphite to the solution thus forming a slurry, (iii) drying the slurry and, (iv) pulverizing the dried substance to a desired particle size.

6. A process according to claim 5 wherein in (iv) the particle size is equivalent to the particle size of the graphite employed.

7. A process according to claim 5 wherein in (iv) the particle size is in the range from 5 to 50 $\mu$m.

* * * * *